United States Patent
Kim et al.

(10) Patent No.: US 9,097,450 B2
(45) Date of Patent: **\*Aug. 4, 2015**

(54) REFRIGERATOR AND ICE MAKER WITH OPTICAL SENSOR TO DETECT ICE LEVEL

(75) Inventors: Yong-Su Kim, Seoul (KR); Dong-Hoon Lee, Seoul (KR); Kyung-Han Jeong, Seoul (KR); Kwang-Ha Suh, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 495 days.

This patent is subject to a terminal disclaimer.

(21) Appl. No.: 12/423,170

(22) Filed: Apr. 14, 2009

(65) Prior Publication Data

US 2009/0255280 A1      Oct. 15, 2009

(30) Foreign Application Priority Data

Apr. 15, 2008   (KR) ................. 10-2008-0034856

(51) Int. Cl.
| | |
|---|---|
| F25C 1/00 | (2006.01) |
| F25C 5/18 | (2006.01) |
| F25C 5/08 | (2006.01) |
| G01F 23/292 | (2006.01) |
| F25C 5/00 | (2006.01) |

(52) U.S. Cl.
CPC ............... *F25C 5/187* (2013.01); *F25C 5/005* (2013.01); *F25C 5/08* (2013.01); *G01F 23/2921* (2013.01); *F25C 2700/00* (2013.01); *F25C 2700/02* (2013.01)

(58) Field of Classification Search
CPC ............ F25C 5/08; F25C 5/187; F25C 5/005; F25C 2700/00; F25C 2700/02; G01F 23/2921
USPC ............... 62/73, 76, 126, 135, 137, 340, 344, 62/353; 250/227.24, 227.25
See application file for complete search history.

(56) References Cited

U.S. PATENT DOCUMENTS

| | | |
|---|---|---|
| 3,860,169 A | 1/1975 | Norman |
| 4,044,348 A | 8/1977 | Huebscher |
| 4,201,910 A | 5/1980 | Copeland et al. ............. 250/216 |

(Continued)

FOREIGN PATENT DOCUMENTS

| | | |
|---|---|---|
| CN | 1435622 A | 8/2003 |
| CN | 2769791 Y | 4/2006 |

(Continued)

OTHER PUBLICATIONS

United States Office Action dated Dec. 27, 2011 issued in U.S. Appl. No. 12/423,118.

(Continued)

*Primary Examiner* — Marc Norman
*Assistant Examiner* — Paolo Gonzalez
(74) *Attorney, Agent, or Firm* — Ked & Associates, LLP

(57) ABSTRACT

An ice detecting apparatus for an ice maker provided in a refrigerator includes an ice maker, and an ice detecting sensor attached to the ice maker and detecting an amount of ice collected in an ice container. The ice detecting sensor includes at least one optical transmitter or emitter provided on one side of the ice maker and at least one receiver at another side of the ice maker. The optical transmitter and receiver are separated by a prescribed distance and, at least one heater is provided to generate heat to be transferred to at least one of the optical transmitter or receiver.

20 Claims, 15 Drawing Sheets

(56) References Cited

U.S. PATENT DOCUMENTS

| | | | |
|---|---|---|---|
| 4,219,172 A | 8/1980 | Murayama | |
| 4,237,366 A | 12/1980 | Berg | |
| 4,756,165 A | 7/1988 | Chestnut et al. | |
| 5,013,911 A * | 5/1991 | Koshida et al. | 250/239 |
| 5,060,484 A | 10/1991 | Bush et al. | |
| 5,160,094 A | 11/1992 | Willis et al. | |
| 5,296,819 A | 3/1994 | Kuroiwa et al. | |
| 5,361,990 A | 11/1994 | Pimentel | |
| 5,376,785 A | 12/1994 | Chin et al. | 250/214 |
| 5,758,377 A | 6/1998 | Cimetta et al. | |
| 6,050,097 A | 4/2000 | Nelson et al. | 62/137 |
| 6,082,130 A | 7/2000 | Pastryk et al. | 62/344 |
| 6,130,410 A | 10/2000 | Kita | |
| 6,148,624 A | 11/2000 | Bishop et al. | 62/137 |
| 6,192,693 B1 * | 2/2001 | Kloppenberg et al. | 62/137 |
| 6,286,324 B1 | 9/2001 | Pastryk et al. | 62/137 |
| 6,314,745 B1 | 11/2001 | Janke et al. | 62/137 |
| 6,351,958 B1 | 3/2002 | Pastryk et al. | 62/137 |
| 6,705,091 B1 | 3/2004 | Kim et al. | 62/74 |
| 6,857,279 B2 | 2/2005 | Kim et al. | 62/135 |
| 7,017,354 B2 | 3/2006 | Lee et al. | 62/73 |
| 7,080,518 B2 | 7/2006 | Kim et al. | 62/73 |
| 7,210,299 B2 | 5/2007 | Yang | 62/71 |
| 7,779,641 B2 | 8/2010 | Lee et al. | 62/137 |
| 7,930,893 B2 | 4/2011 | Coffey | |
| 8,156,748 B2 | 4/2012 | Ashrafzadeh et al. | |
| 8,424,323 B2 | 4/2013 | Austin et al. | |
| 2002/0047007 A1 | 4/2002 | Loyd, Sr. et al. | |
| 2002/0083726 A1 | 7/2002 | Kim et al. | |
| 2005/0066670 A1 | 3/2005 | Chung et al. | |
| 2005/0072167 A1 | 4/2005 | Oh | |
| 2006/0168983 A1 | 8/2006 | Tatsui et al. | |
| 2006/0213213 A1 * | 9/2006 | Chung et al. | 62/344 |
| 2006/0260347 A1 | 11/2006 | Coulter et al. | 62/344 |
| 2007/0137241 A1 | 6/2007 | Lee et al. | |
| 2008/0156005 A1 | 7/2008 | Culley et al. | 62/132 |
| 2008/0157644 A1 | 7/2008 | Lee et al. | 312/405 |
| 2008/0264074 A1 | 10/2008 | Chase et al. | |
| 2009/0100847 A1 | 4/2009 | Moon et al. | 62/66 |
| 2009/0165471 A1 | 7/2009 | Rafalovich et al. | 62/66 |
| 2009/0211292 A1 | 8/2009 | Smith et al. | 62/344 |
| 2010/0204832 A1 | 8/2010 | Choi et al. | 700/275 |

FOREIGN PATENT DOCUMENTS

| | | |
|---|---|---|
| EP | 476738 | 3/1992 |
| JP | 03-93379 | 9/1991 |
| JP | 05-280848 | 10/1993 |
| JP | 2000-105115 A | 4/2000 |
| JP | 2003-332027 A | 11/2003 |
| KR | 10-2003-0021529 | 3/2003 |
| KR | 10-2003-00215129 A | 3/2003 |
| KR | 10-2005-0033729 A | 4/2005 |
| KR | 10-2008-0026385 A | 3/2008 |
| WO | WO 2009/128614 | 10/2009 |

OTHER PUBLICATIONS

PCT International Search Report dated Nov. 6, 2009 for Application No. PCT/KR2009/001709.
PCT International Search Report dated Nov. 6, 2009 for Application No. PCT/KR2009/001863.
Office Action dated Apr. 14, 2011 issued in U.S. Appl. No. 12/471,078.
United States Final Office Action dated Nov. 22, 2011 issued in U.S. Appl. No. 12/471,048.
Hodgin, Michael J., et al.; "Advanced Boron Nitride Epoxy Formulations Excel in Thermal Management Applications"; Proceedings of the Technical Programs, NEPCON WEST 1999 Conference; Feb. 23-25, 1999; Anaheim, CA; pp. 359-366.
Final Office Action issued in U.S. Appl. No. 12/423,118 dated Jul. 24, 2012.
Final Office Action issued in U.S. Appl. No. 12/423,256 dated Sep. 4, 2012.
Notice of Allowance issued in U.S. Appl. No. 12/470,615 dated Oct. 12, 2012.
Australian Office Action issued in AU Application No. 2009340579 dated Nov. 28, 2012.
Office Action issued in U.S. Appl. No. 12/433,944 dated Oct. 26, 2012.
Office Action issued in U.S. Appl. No. 12/471,048 dated Nov. 20, 2012.
Office Action issued in U.S. Appl. No. 12/423,118 dated Dec. 20, 2012.
United States Final Office Action dated Jul. 17, 2014 issued in U.S. Appl. No. 12/708,073.

* cited by examiner

REFRIGERATOR AND ICE MAKER WITH OPTICAL SENSOR TO DETECT ICE LEVEL

BACKGROUND

1. Field

The patent disclosure relates to a refrigerator.

2. Background

A refrigerator refrigerates or freezes food items or the like to keep them fresh in storage. The refrigerator includes an ice maker for making ice and an ice container to receive ice made by the ice maker.

A full ice detection lever, a mechanical device, coupled to a controller detects whether or not the ice container is full of ice. The full ice detection lever positioned at a lower side and rises as high as the ice is accumulated in the ice container. When the full ice detection lever rises by more than a certain height due to ice accumulation, the controller determines that the ice container is full. However, in the related art, if the full ice detection lever becomes frozen, the mechanical operation of the full ice detection lever is not likely to be performed, and the controller cannot determine whether the ice container is full. In such faulty state, ice is continuously supplied, causing an overflow of ice from the ice container.

SUMMARY OF THE DISCLOSURE

An ice detecting apparatus of an ice maker disposed to make ice in a refrigerator includes an ice maker and an ice detecting sensor to detect an amount of ice storage container. The ice detecting sensor may be disposed at the ice maker. The ice detecting sensor may also be heated by a heater.

BRIEF DESCRIPTION OF THE DRAWINGS

The embodiments will be described in detail with reference to the following drawings in which like reference numerals refer to like elements wherein.

DETAILED DESCRIPTION

Figure 1:
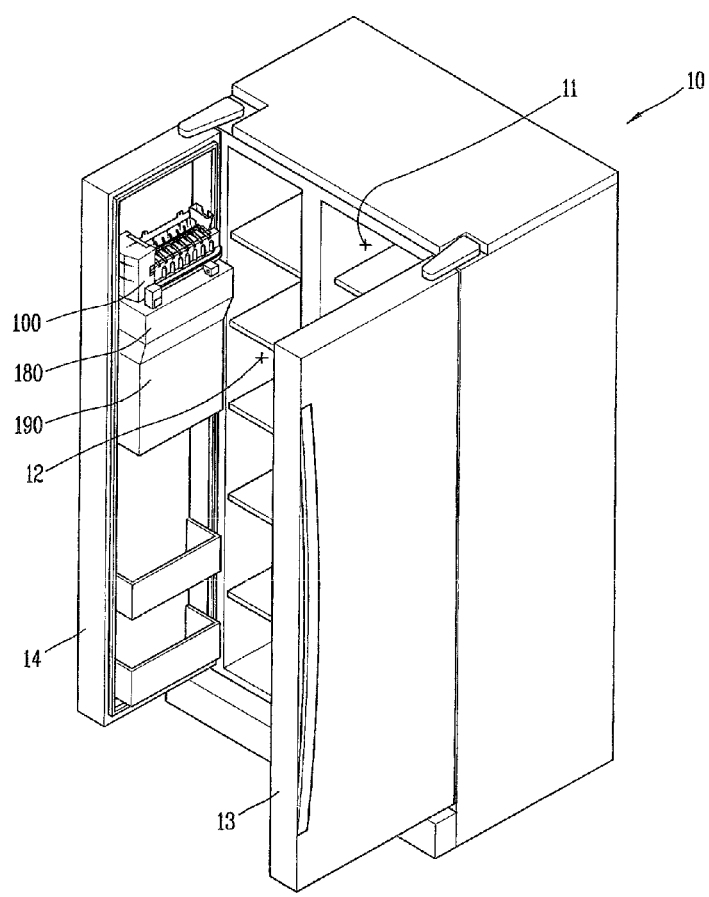
FIG. 1 is a front perspective view of a refrigerator employing an ice detecting apparatus of an ice maker according to a first embodiment.

FIG. 1 is a front perspective view of a refrigerator employing an ice-full state detecting apparatus of an ice maker according to a first embodiment. A refrigerator 10 includes a refrigerating chamber 11 for keeping food or storage items in storage in a cool state at an above-zero temperature, and a freezing chamber 12 for keeping food storage items such as ice at a near or below-zero temperature. An ice maker 100 is provided in the freezing chamber 12 and an ice storage container or storage bin 180 stores ice made by the ice maker 100. A dispenser 190 supplies ice kept in the ice container 180 when user demands. One of ordinary skill in the art can appreciate that the refrigerator 10 includes various components such as a compressor, a condenser, an expander, an evaporator, and the like, to form a refrigerating cycle. The refrigerating chamber 11 and the freezing chamber 12 are accessed using a refrigerating chamber door 13 and a freezing chamber door 14, rotatably attached to the housing.

After a prescribed amount of water is supplied to the ice maker 100, ice is made by the supplied cooling air in the ice maker 100, and the ice is separated from the ice maker 100 according to a self-operation of the ice maker 100. The ice falls into the ice container 180 so as to be collected therein. The ice collected in the ice container 180 is supplied to the user by a desired amount through the dispenser 190. As can be appreciated, the ice maker 100 may be installed inside the freezing chamber 12 rather than on the door 14.

Figure 2:
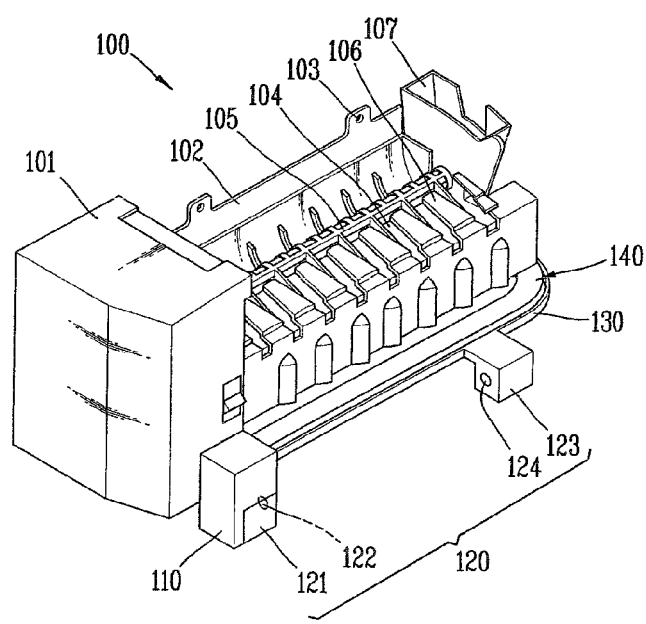
FIG. 2 is a perspective view of the ice maker for the refrigerator employing the ice detecting apparatus according to the first embodiment.
Figure 3:
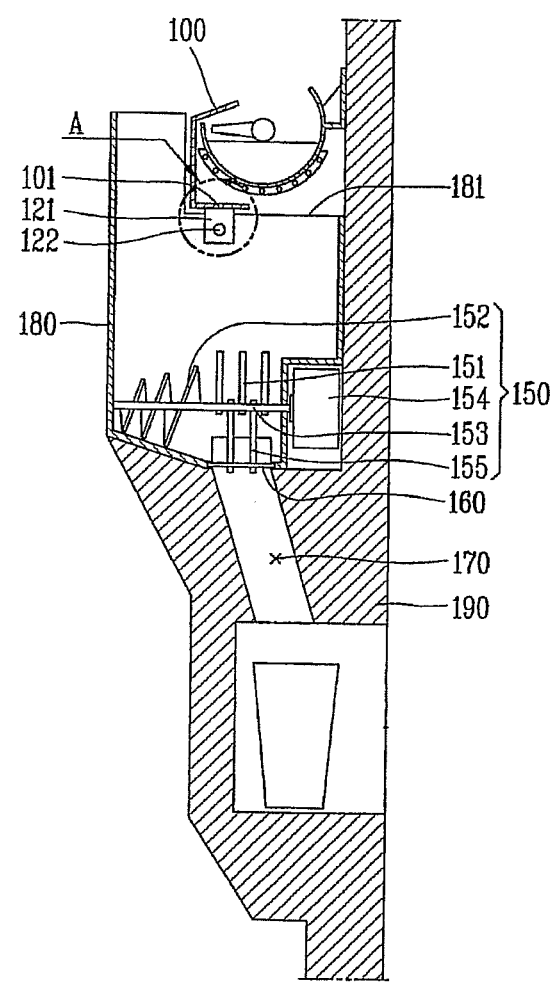
FIG. 3 is a vertical sectional view of the ice maker for the refrigerator employing the ice detecting apparatus according to the first embodiment.
Figure 4:
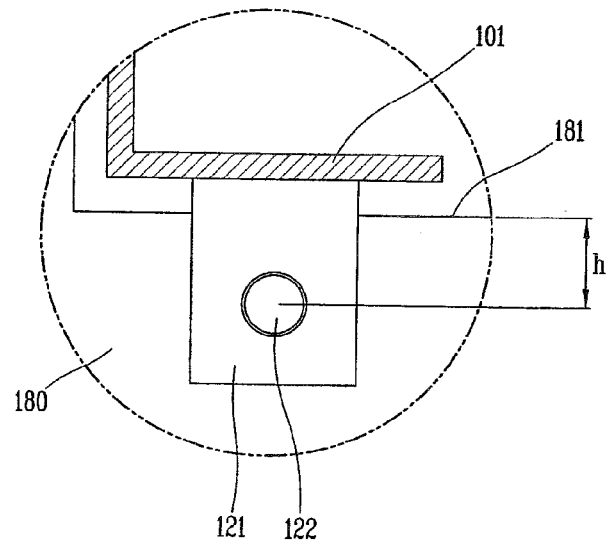
FIG. 4 is an enlarged view of a portion 'A' in FIG. 3.

FIG. 2 is a perspective view of the ice maker for the refrigerator employing the ice detecting apparatus according to the first embodiment. FIG. 3 is a vertical sectional view of the ice maker for the refrigerator employing the ice detecting apparatus according to the first embodiment, and FIG. 4 is an enlarged view of a portion 'A' in FIG. 3.

A water supply unit 107 of an ice maker 100 receives water provided from the exterior, and ice is made in an ice making chamber 104 of an ice maker 100. An ejector 105 of an ice maker 100 separates ice made in the ice making chamber 104, and an ice maker body 101 of an ice maker 100 includes a plurality of components for rotating the ejector 105. A rotational shaft extends out of the ice maker body 101. The ejector 105 has portions (or arms) extending outwardly (or radially) from the shaft and rotates according to a rotational movement of the shaft in order to pick up ice.

A mounting unit or plate 102 is formed behind the ice making chamber 104 to mount the ice maker 100 within the refrigerator. Holes 103, into which a combining protrusion is inserted, allow the mounting unit 102 to be mounted on the door or within the freezing chamber. A separator 106 is formed at an upper portion of the ice making chamber 104 to allow ice to be picked up by the ejector 105 to be guided and fall into the ice container 180.

A heater 140 is installed at a lower portion of the ice making chamber 104 in order to apply heat to allow the interfaces of ice and an inner surface of the ice making chamber 104 to be separated from each other. The heater 140 may be electrically connected to an external power source, which may be provided within the ice maker body 101.

A heater support 130 may be formed at a lower portion of the heater 140. The heater support 130 may be connected with the ice maker body 101, or the heater support 130 may be molded together with the ice maker body 101. In this embodiment, a sensor housing 110 extends with a certain length in a downward direction from the ice maker body 101. A portion of the heater support 130 extends up to a position corresponding to the sensor housing 110.

A transmitting unit or module 121 is installed in the sensor housing 110, and a receiving unit or module 123 is installed at a portion extending from the heater support 130 to correspond to the sensor housing 110 or the transmitting unit 121. A transmitter 122 and a receiver 124 for transmitting and receiving signals are installed in the transmitting unit 121 and the receiving unit 123, respectively, to face each other. Based on the transmitting and received signals, the transmitting unit 121 and the receiving unit 123 are used to detect an ice-full state of the ice container 180. An ice detecting sensor 120 comprises at least one of the transmitter 122 and the receiver 124, and may further include transmitting and receiving units 121, 123, or sensor housing, and is used to determine or detect ice full state of the ice container 180.

The ice detecting sensor 120 may be disposed in or near the top, above or below the top of the ice container 180 at a position corresponding to the height at which ice is fully accumulated or collected. The transmitter and/or receiver may be optical devices to transmit or receive IR light. For example, the transmitter or emitter may be an IR photo diode and the receiver may be a photo transistor. The structure of the optical emitter or receiver is disclosed in U.S. Pat. No. 4,201,910, whose entire disclosure is incorporated herein by reference.

As shown in FIGS. 3 and 4, the transmitting unit 121 of the ice detecting sensor 120 extends in a downward direction down to the interior of the ice storage container 180. The transmitter 122 is installed or positioned at a lower portion of the transmitting unit 121. The transmitter is disposed at a position corresponding to the height of the ice-full state of the ice container 180. Although, the position of the transmitter 122 has been described, the receiving unit 123 and the receiver 124 may be formed to correspond to or near the height of the transmitting unit 121 and the transmitter 122, as can be appreciated by one of ordinary skill in the art. In this embodiment, a detection height of the ice detecting sensor 120 may have a certain height difference (h) from an upper end or top ridgeline 181 of the ice container 180.

The transmitting unit 121 and the receiving unit 123 of the ice detecting sensor 120 are located at both sides of an ice discharging outlet, a passage through which ice is discharged from the ice maker body 101. The receiver 124 receives infrared rays transmitted from the transmitter 122, traversing the ice discharging outlet, and provide corresponding signals for determining whether the ice container 180 is substantially full of ice to detect the ice-full state. As can be appreciated, the location of the transmitting module and the receiving module may be reversed, i.e., receiver on the left and emitter on the right.

In this embodiment, the transmitter module and the receiver module are separated by a prescribed distance which is less than a width of the storage bin. Such lesser distance to the width allows the modules to be placed within the storage bin. In an alternative embodiment, the distance may be greater than the width such that the modules may be located outside the storage bin, which may have a cut-out to allow passage of the light or may be made of transparent material.

A transfer unit 150 is installed at a lower portion of the ice container 180. The transfer unit 150 transfers ice stored in the ice container 180 (crushes the ice into an appropriate size, if desired) through an outlet 160 and a guide path 170 to a dispenser 190.

The transfer unit or assembly 150 includes a fixed blade 155 fixed in the ice container 180, a rotatable blade 151 relatively rotating with respect to the fixed blade 155, a rotational shaft 153 to which the rotational blade 151 is connected, a motor 154 connected to the rotational shaft 153, and a transfer blade 152 to allow the transfer or ice. The rotatable blade 151 is formed at one side of the rotational shaft 153, and the transfer blade 152 is formed at the other side of the rotational shaft. Thus, when the rotational shaft 153 is rotated, the rotational blade 151 and the transfer blade 152 can be rotated together. A spiral auger may be used as the transfer blade 152.

Water is guided by a water supply pipe of a certain shape so as to be supplied to the water supply unit 107. The supplied water is introduced into the ice making chamber 104, and below-zero or near zero cold air is provided in the ice making chamber to freeze water received in the ice making chamber 104. After the water within the ice making chamber 104 becomes frozen, heat is applied toward the ice making chamber 104 by the heater 140 to allow the ice and the contact surface of the ice making chamber 104 to be separated from each other.

The ejector 105 operates by a certain driving mechanism installed in the ice maker body 101 to pick up the ice. After the ice is picked up by the ejector 105, it is guided by the separator 106 and then falls into the ice container 180 for storage. This operation is repeated, and when the ice container 180 is near full or full of ice, the ice detecting sensor 120 detects the ice-full state, and the operation of the ice maker 100 is stopped.

When ice supply to the user via the dispenser 190 is requested, the motor 154 is driven and the rotational shaft 153 connected to the motor 154 is rotated. Then, the rotational blade 151 and the transfer blade 152 are rotated in conjunction. As the transfer blade 152 is rotated, ice in a lower portion of the ice container 180 is transferred toward the rotational blade 151. When the ice guided toward the rotational blade 151 is caught between the rotational blade 151 and the fixed blade 155, it is crushed according to a pushing operation of the rotational blade 151. The crushed ice is dispensed through the outlet 160 formed at a lower side of the fixed blade 155. The dispensed ice falls through the guide path 170. The fallen ice is then supplied to the user via the dispenser 190. As can be appreciated, various components described above are controlled by at least one controller provided in the ice maker and/or the refrigerator, including making a determination of a full-state based on at least one signal received from the receiver.

Various types of ice makers and operations thereof are disclosed in U.S. Pat. Nos. 7,210,299, 7,080,518, 7,017,354, 6,857,279, and 6,705,091, whose entire disclosures are incorporated herein by reference. These patents are also commonly assigned to the same assignee of this application.

Figure 5:
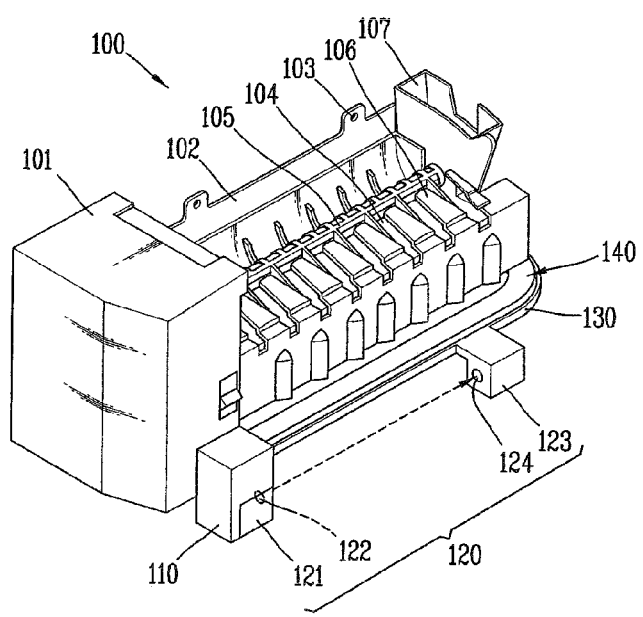
FIG. 5 is a perspective view snowing that the ice detecting apparatus of the ice maker for the refrigerator detects a state before full ice according to the first embodiment.
Figure 6:
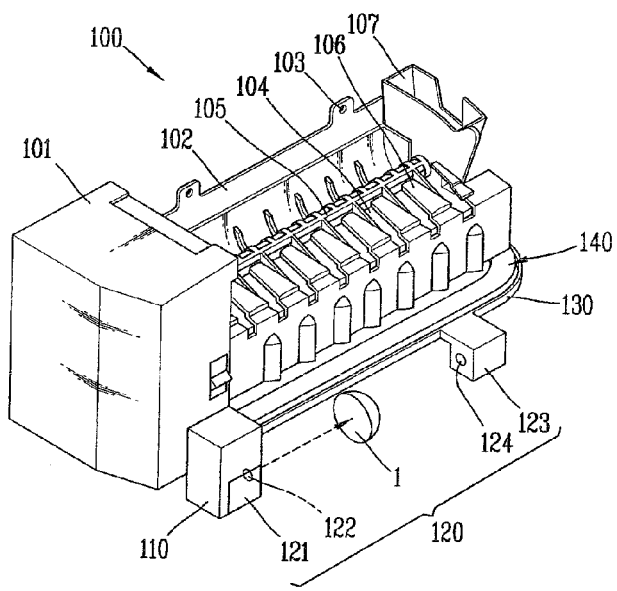
FIG. 6 is a perspective view showing that the ice detecting apparatus of the ice maker for the refrigerator detects an ice-full state according to the first embodiment.

FIG. 5 is a perspective view showing that the ice detecting apparatus of the ice maker for the refrigerator detects a state before full ice according to the first embodiment. FIG. 6 is a perspective view showing that the ice detecting apparatus of the ice maker for the refrigerator detects an ice-full state according to the first embodiment.

Ice made by the ice maker 100 is discharged and falls into the ice storage container 180. The fallen ice is collected and stored within the ice storage container 180. While the ice is collected in the ice container 180, and/or before the ice accommodating container 180 is full of ice, infrared rays or light transmitted from the transmitter 122 reach the receiver 124, and the controller determines whether the ice container 180 is full of ice based on signals received from or detected by the receiver. As ice is collected and stored, ice would reach the full or near full height of the ice container 180. Hence, as shown in FIG. 6, infrared rays transmitted from the transmitter 122 is interrupted by the ice 1, e.g., the optical path between the optical emitter and receiver is blocked, failing to reach the receiver 124, and the controller determines that the ice container 180 is full or near full of ice 1.

In this embodiment, the ice detecting sensor 120 is disposed at the ice maker body 101 and detects full or near full ice collected within the ice container 180. Because the ice detecting sensor 120 can detect a level of ice stored in the ice container 180, the related art problem(s) of a mechanical ice detecting lever (or the like) can be avoided. The ice filled state of the ice container 180 can be more accurately and stably detected.

Figure 7:
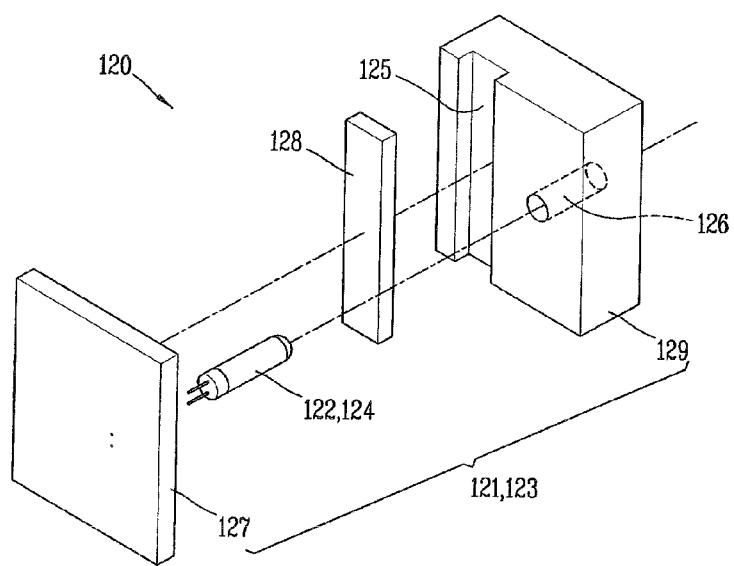
FIG. 7 is a perspective view showing an exploded state of an ice detecting sensor applied to the ice detecting apparatus of the ice maker for the refrigerator according to the first embodiment.
Figure 8:
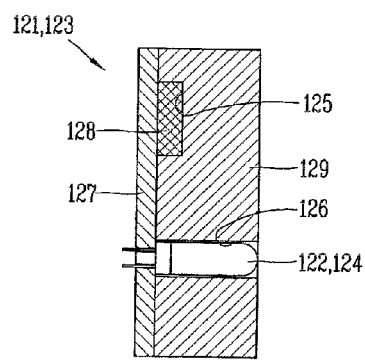
FIG. 8 is a sectional view showing a coupled state of the ice detecting sensor applied to the ice detecting apparatus of the ice maker for the refrigerator according to the first embodiment.

FIG. 7 is a perspective view showing an exploded state of an ice detecting sensor applied to the ice detecting apparatus of the ice maker for the refrigerator according to the first embodiment, and FIG. 8 is a sectional view showing a coupled state of the ice detecting sensor applied to the ice detecting apparatus of the ice maker for the refrigerator according to the first embodiment. Hereinafter, any content and explanation that have been already made for the first embodiment or is readily apparent to one of ordinary skill in the art based on the present disclosure, will be omitted for brevity.

The ice detecting apparatus includes an ice detecting sensor 120 having the transmitting unit or transmitter module 121 and the receiving unit 123. Hereafter, only the transmitting unit 121 will be described, as such description of the transmitting unit 121 is also similarly or readily applicable to the receiving unit or receiver module 123, as shown in the Figure labeling. An insertion hole 126 is formed at a cover 129 to allow the transmitter 122 (or receiver 124) to be inserted therein. A sensor heater mounting recess 125 is formed near the insertion hole 126 to allow the sensor heater 128 to be mounted therein.

The insertion hole 126 is formed to allow the transmitter 122 to be inserted in a horizontal direction, and the sensor heater mounting recess 125 may be formed on a rear surface of the cover 129, namely, at the side facing a circuit unit or a printed circuit board (PCB) 127. The sensor heater mounting recess 125 may be formed to be long in a vertical direction having a rectangular shape (but other shapes are possible). The cover 129 supports the transmitter 122 and the sensor heater 128, and may be made of a plastic material to allow transfer of heat from the sensor heater 128 to the transmitter 122 (or receiver 124). The cover 129 allows a signal or signals of the transmitter 122 to be transmitted therethrough and protects the transmitter 122 against an external force or environment. The sensor heater 128 may be formed as a thin plate-like heater. The plate heater may be a resistive element or resistor.

With such configuration, heat generated from the sensor heater 128 can be transferred to the transmitter 122 and/or the circuit unit 127 to prevent formation of moisture or frost and/or to remove frost that may be formed on the transmitter 122 (or transmitter module). Thus, the ice-full state detecting sensor 120 can accurately detect whether ice is full or not. In addition, heat generated by the sensor heater 128 may be transferred to the transmitter 122 only via the cover 129, or in order to improve heat transmission efficiency, heat generated by the sensor heater 128 may be transferred to the transmitter 122 via both the cover 129 and the PCB 127. The sensor heater 128 may be configured to be electrically connected with circuitry (not shown) within the ice maker body 101 via the PCB 127 to which the transmitter 122 is connected, or the sensor heater 128 may be configured to be electrically connected directly with the circuitry.

Figure 9:
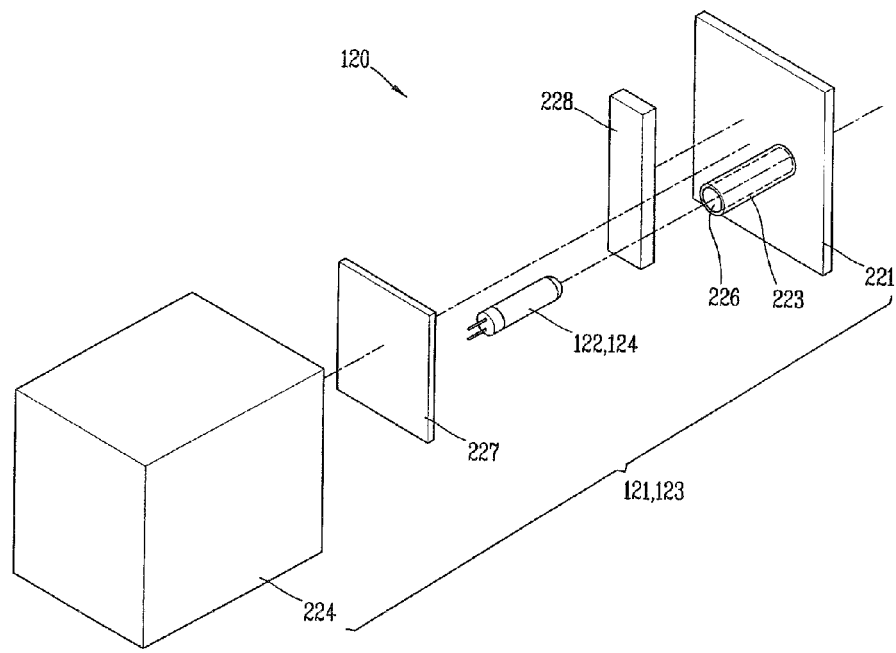
FIG. 9 is a perspective view showing an exploded state of an ice detecting sensor applied to an ice detecting apparatus of an ice maker for a refrigerator according to a second embodiment.
Figure 10:
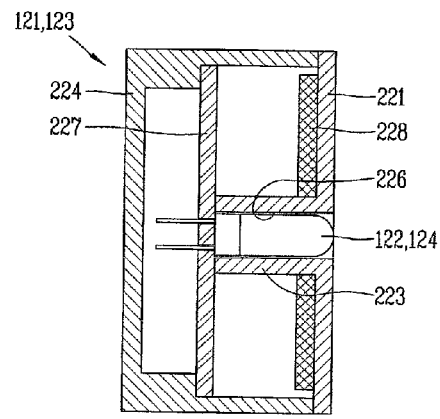
FIG. 10 is a sectional view showing a coupled state of the ice detecting sensor applied to the ice detecting apparatus of the ice maker for the refrigerator according to the second embodiment.

FIG. 9 is a perspective view showing an exploded state of an ice-full state detecting sensor applied to an ice detecting apparatus of an ice maker for a refrigerator according to a second embodiment, and FIG. 10 is a sectional view showing a coupled state of the ice detecting sensor applied to the ice detecting apparatus of the ice maker for the refrigerator according to the second embodiment.

The ice detecting apparatus of the ice maker 100 includes an ice detecting sensor 120 including a transmitting unit 121 with a sensor heater 228. An extending pipe 223 is formed to extend with a certain length on the side of a cover 221 that faces a PCB 227. The extending pipe 223 includes an insertion hole 226 in which a transmitter 122 can be inserted and/or aligned. The insertion hole 226 may be formed in a horizontal direction of the cover 221. The cover 221 also may include a hole which is aligned with the pipe 223.

The sensor heater 228 is provided on a portion of the cover 221 near the extending pipe 223. The sensor heater 228 may be attached with the cover 221 by a tape or other adhesive. The extending pipe 223 allows a detect signal, e.g., an optical signal, transmitted from the transmitter 122 to pass therethrough, and covers the transmitter 122. Because the sensor heater 228 is installed at the outer side of the extending pipe 223, heat generated from the sensor heater 228 can be transmitted to the transmitter 122 via the cover 221 and the extending pipe 223. The heat prevents the formation of moisture and/or frost, and in the alternative embodiment, if frost is formed, frost that may form on the transmitter 122 can be removed, and prevents possible erroneous operation of the ice detecting sensor.

A casing 224 combined with the cover 221 form a hermetically enclosed space. The transmitter 122 and the sensor heater 228 are disposed in the hermetically enclosed space so as to be protected.

Figure 11:
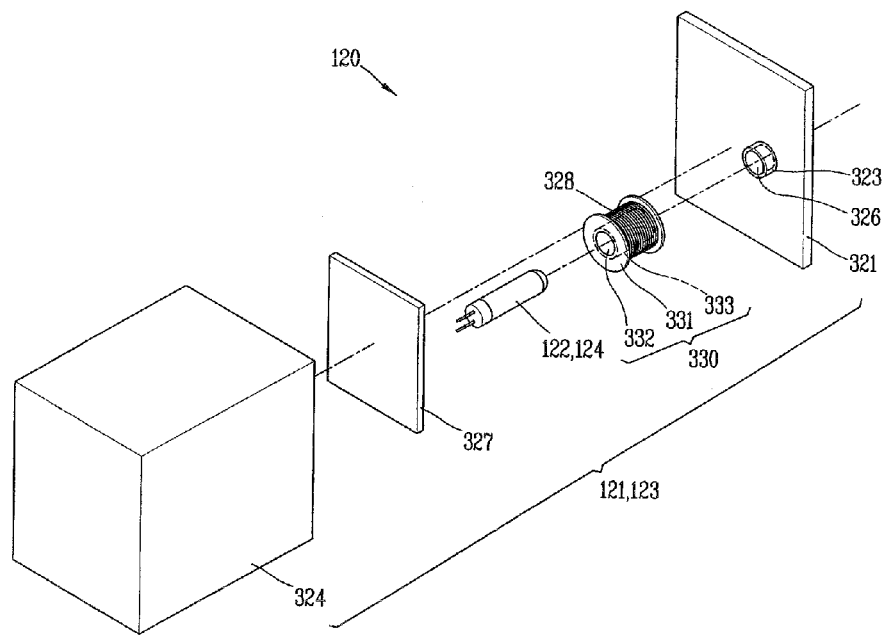
FIG. 11 is a perspective view showing an exploded state of an ice detecting sensor applied to an ice detecting apparatus of an ice maker for a refrigerator according to a third embodiment.
Figure 12:
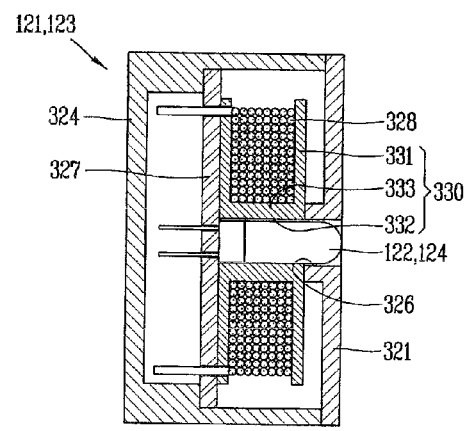
FIG. 12 is a sectional view showing a coupled state of the ice detecting sensor applied to the ice detecting apparatus of the ice maker for the refrigerator according to the third embodiment.

FIG. 11 is a perspective view showing an exploded state of an ice detecting sensor applied to an ice detecting apparatus of an ice maker 100 for a refrigerator according to a third embodiment, and FIG. 12 is a sectional view showing a coupled state of the ice detecting sensor applied to the ice-full state detecting apparatus of the ice maker for the refrigerator according to the third embodiment. As shown, an ice detecting sensor 120 includes a transmitting unit or module 121 having a sensor heater 328, and a casing or housing 324 combined with a cover 321 to form a hermetically enclosed space. An extending pipe 323 is formed to extend with a certain length on the side of the cover 321 that faces a circuit unit or a PCB 327. The extending pipe 323 includes an insertion hole 326 in which a transmitter 122 can be inserted and/or aligned. The insertion hole 326 may be formed in a horizontal direction of the cover 321. A rear surface portion of the transmitter 122 is coupled to a PCB 327 and the leads may penetrate the PCB 327.

A sensor heater accommodating body or bobbin 330 is disposed between the end of the extending pipe 323 and the PCB 327. In this embodiment, the sensor heater 328 is a coil type formed around the periphery of the transmitter 122. The sensor heater 328 is wound around the sensor heater accommodating body 330. The sensor heater accommodating body 330 includes a flange 331, a hole 332, and a wound portion or cylindrical body 333.

The wound portion 333 is where the sensor heater or heater wiring(s) 328 is wound several times. The flange 331 is formed at both ends of the wound portion 333, having a diameter larger than that of the wound portion 333, so that the sensor heater 328 wound on the wound portion 333 may not be released. The hole 332 allows the transmitter 122 to pass therethrough. After passing through the hole 332, a front surface portion of the transmitter 122 is inserted into the insertion hole 326 of the extending pipe 323.

Because the sensor heater or wire 328 is wound in the coil form on the sensor heater accommodating body 330 in which the transmitter 122 is inserted and/or aligned therein, heat generated from the sensor heater 328 can be uniformly transferred to substantially an entire outer surface of the transmitter 122. The heat prevents the formation of moisture and/or frost, and in the alternative embodiment, if frost is formed, the frost on the transmitter 122 can be removed, and prevents possible erroneous operation of the ice detecting sensor.

Figure 13:
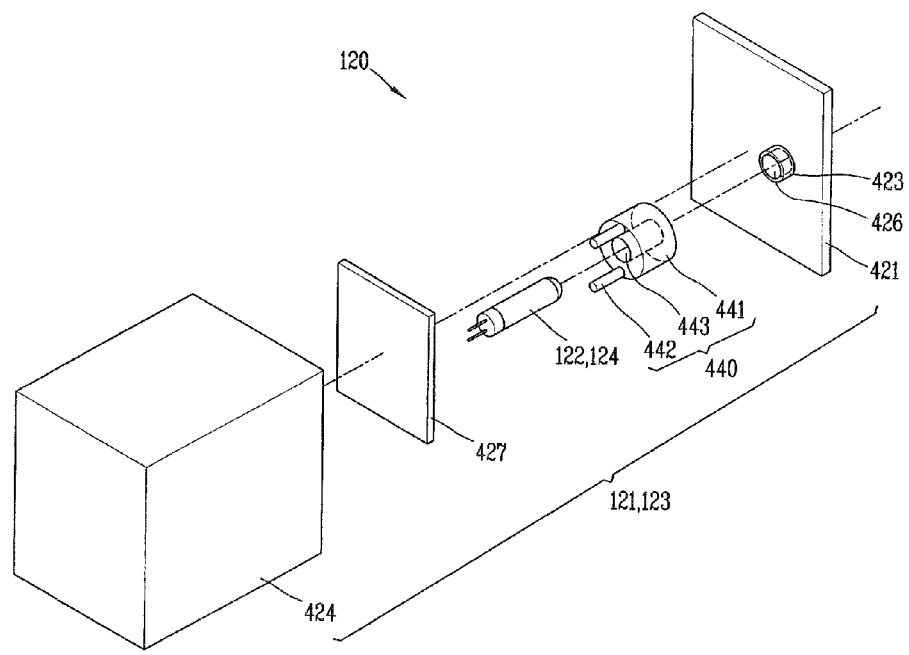
FIG. 13 is a perspective view showing an exploded state of an ice detecting sensor applied to an ice detecting apparatus of an ice maker for a refrigerator according to a fourth embodiment.
Figure 14:
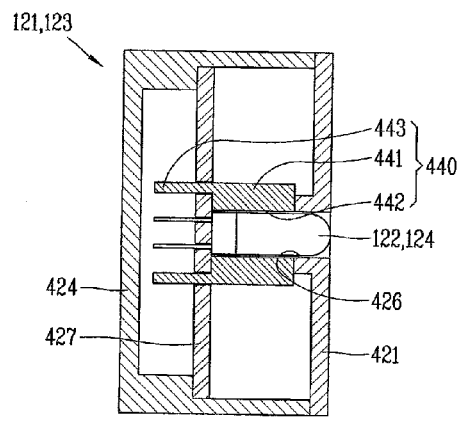
FIG. 14 is a sectional view showing a coupled state of the ice detecting sensor applied to the ice detecting apparatus of the ice maker for the refrigerator according to the fourth embodiment.

FIG. 13 is a perspective view showing an exploded state of an ice detecting sensor applied to an ice detecting apparatus of an ice maker for a refrigerator according to a fourth embodiment, and FIG. 14 is a sectional view showing a coupled state of the ice detecting sensor applied to the ice detecting apparatus of the ice maker for the refrigerator according to the fourth embodiment. An ice detecting sensor 120 includes a transmitter module 121 with a sensor heater 440. A casing 424 combined with the cover 421 form a hermetically sealed space. An extending pipe 423 is formed to extend with a certain length on the side of the cover 421 that faces a PCB 427. The extending pipe 423 includes an insertion hole 426 in which a transmitter 122 can be inserted and/or aligned. The sensor heater 440 is provided between the end or the extending pipe 423 and the PCB 427.

The sensor heater 440 may be made of an electroconductive heating material, for example, a polymer material, that can simultaneously transfer electricity and heat. When power is applied to the sensor heater 440, it is heated. The heat generated by the sensor heater 440 may be transferred to the transmitter 122. The sensor heater 440 includes a body 441, a power connection terminal 442 extending from the body 441 and connected with a power source, and penetrating hole 443 penetratingly formed in the body 441. The penetrating hole 443 allows the transmitter 122 to pass therethrough. After passing through the transmitter penetrating hole 432, a front surface portion of the transmitter 122 is inserted into the insertion hole 426 of the extending pipe 423.

Because the sensor heater 440 is made of an electroconductive heating material that can generate heat upon application of power, it is not necessary to additionally form a heater. The configuration of the ice detecting apparatus may be simplified and the fabrication of the ice detecting apparatus can be facilitated. In addition, because the sensor heater 440 covers the transmitter 122, heat generated by the sensor heater 440 can be uniformly transferred to substantially the entire surface of the transmitter 122. The heat prevents the formation of moisture and/or frost, and in the alternative embodiment, if frost is formed, the frost on the transmitter 122 can be readily removed, and prevents possible erroneous operation of the ice detecting sensor.

Figure 15:
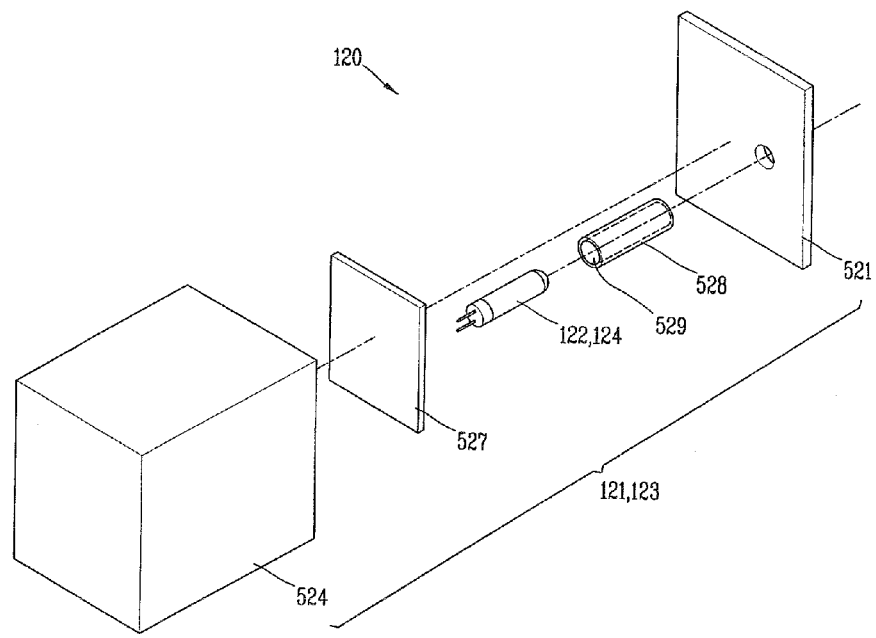
FIG. 15 is a perspective view showing an exploded state of an ice detecting sensor applied to an ice detecting apparatus of an ice maker for a refrigerator according to a fifth embodiment.
Figure 16:
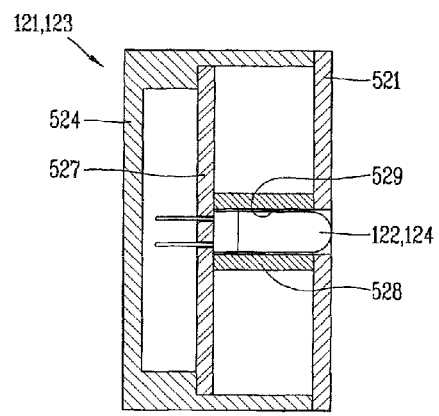
FIG. 16 is a sectional view showing a coupled state of the ice detecting sensor applied to the ice detecting apparatus of the ice maker for the refrigerator according to the fifth embodiment.

FIG. 15 is a perspective view showing an exploded state of an ice detecting sensor applied to an ice detecting apparatus of an ice maker for a refrigerator according to a fifth embodiment, FIG. 16 is a sectional view snowing a coupled state of the ice detecting sensor applied to the ice detecting apparatus of the ice maker for the refrigerator according to the fifth embodiment. An ice detecting sensor 120 including a transmitter module 121 with a sensor heater 528 provided in a hermetically sealed housing formed by a casing 524 with a cover 521.

The sensor heater 528 may be made of an electroconductive heating material. When power is applied to the sensor heater 528, the sensor heater 528 is heated, and the heat generated by the sensor heater 528 can be transferred to the transmitter 122. The sensor heater 528 includes an insertion hole 529. The sensor heater 528 has a tubular or cylindrical shape longer by a certain length than the transmitter 122. The transmitter 122 is inserted into the insertion hole 529 and the transmitter 122 is positioned within the sensor heater 528.

With such a configuration, the sensor heater 528 serves as an extending pipe in which the transmitter 122 is inserted and protected therein, and also serves as a heat supply source for preventing moisture or frost, and for defrosting the transmitter 122. Thus, it is not necessary to provide a separate heater as well as an extending pipe. The configuration of the ice detecting apparatus can be more simplified, and the fabrication of the ice detecting apparatus can be further facilitated.

In addition, because the sensor heater 528 covers the transmitter 522, heat generated from the sensor heater 528 can be uniformly transferred to the entire surface of the transmitter 122. The heat prevents the formation of moisture and/or frost, and in the alternative embodiment, if frost is formed, frost that on the transmitter 122 can be removed, and prevents possible erroneous operation of the ice detecting sensor.

Here, the sensor heater 528 may be electrically connected with an ice making circuit unit within the ice maker body 101 via the circuit unit 527, or may be directly electrically connected with the ice making circuit unit without the circuit unit 527.

Figure 17:
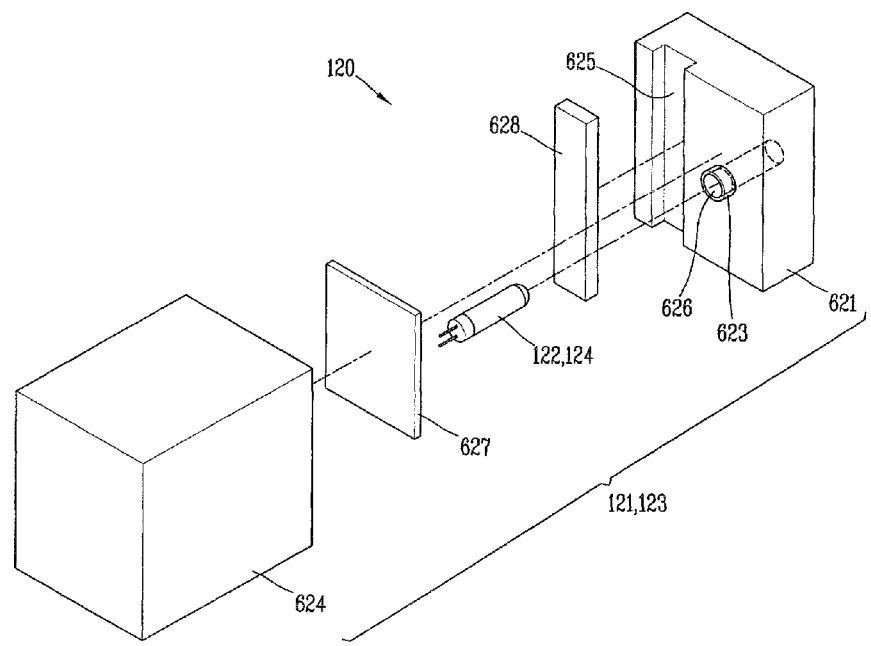
FIG. 17 is a perspective view showing an exploded state of an ice detecting sensor applied to an ice detecting apparatus of an ice maker for a refrigerator according to a sixth embodiment.
Figure 18:
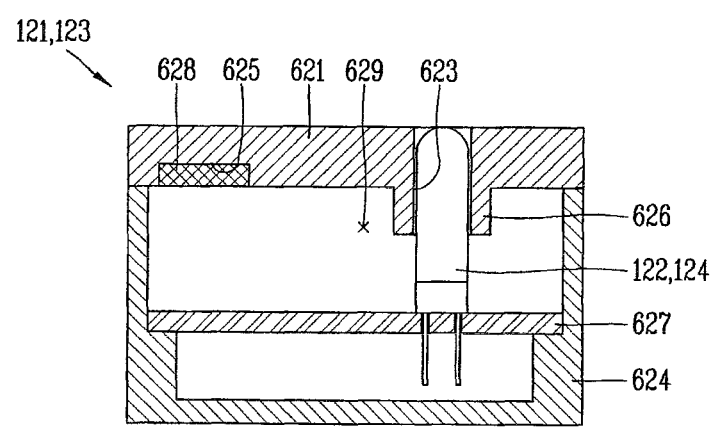
FIG. 18 is a sectional view showing a coupled state of the ice detecting sensor applied to the ice detecting apparatus of the ice maker for the refrigerator according to the sixth embodiment.

FIG. 17 is a perspective view showing an exploded state of an ice detecting sensor applied to an ice detecting apparatus of an ice maker for a refrigerator according to a sixth embodiment, and FIG. 18 is a sectional view showing a coupled state of the ice detecting sensor applied to the ice detecting apparatus of the ice maker for the refrigerator according to the sixth embodiment. An ice detecting sensor 120 includes a transmitting unit 121 with a sensor heater 628 applying heat to the ice detecting sensor. A casing 624 combined with the cover 621 hermetically seals the transmitter 122 and the sensor heater 628. The sensor heater 628 may be a panel heater inserted in a sensor heater mounting recess 625.

An extending pipe 623 is formed to extend with a certain length on the side of the cover 621 that faces a PCB 627. The extending pipe 623 includes an insertion hole 626 in which a front surface portion of the transmitter 122 can be inserted and/or aligned. The insertion hole 626 may be formed in a horizontal direction of the cover 621. A rear surface portion of the transmitter 122 is in contact with the PCB 627, and the leads penetrate the PCB 627.

With such a configuration, the sensor heater 628 is disposed in the hermetically enclosed space 629 of the casing 624, and only the front surface portion of the transmitter 122 is inserted in the extending pipe 623 and the rest of the body is provided in the hermetically enclosed space. Accordingly, heat generated by the sensor heater 628 can heat air in the hermetically closed space 629 and heat can be transferred to the transmitter 122 through the heated air. With this method, the efficiency of heat transfer from the sensor heater 628 to the transmitter 122 may be improved.

Figure 19:
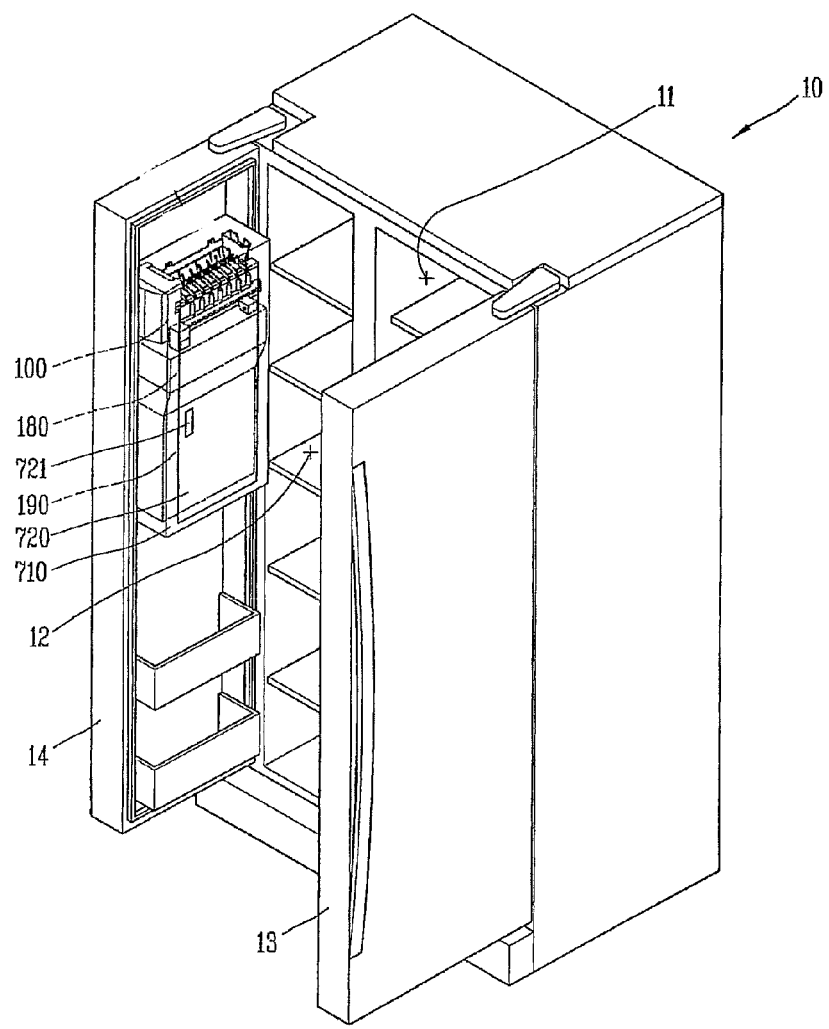
FIG. 19 is a perspective view showing a front side of a refrigerator employing an ice detecting apparatus of an ice maker for a refrigerator according to a seventh embodiment.
Figure 20:
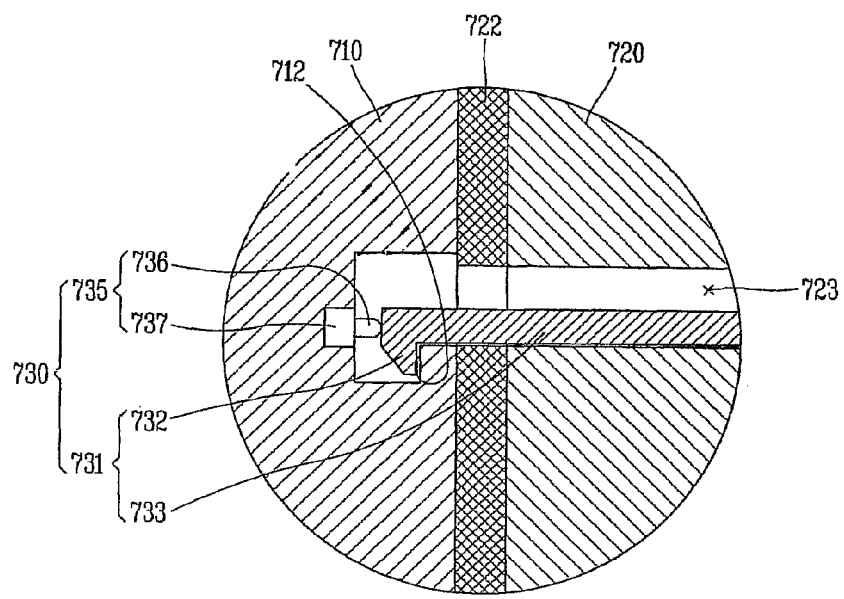
FIG. 20 is a sectional view showing a switch pressed in the ice detecting apparatus of an ice maker for a refrigerator according to the seventh embodiment.
Figure 21:
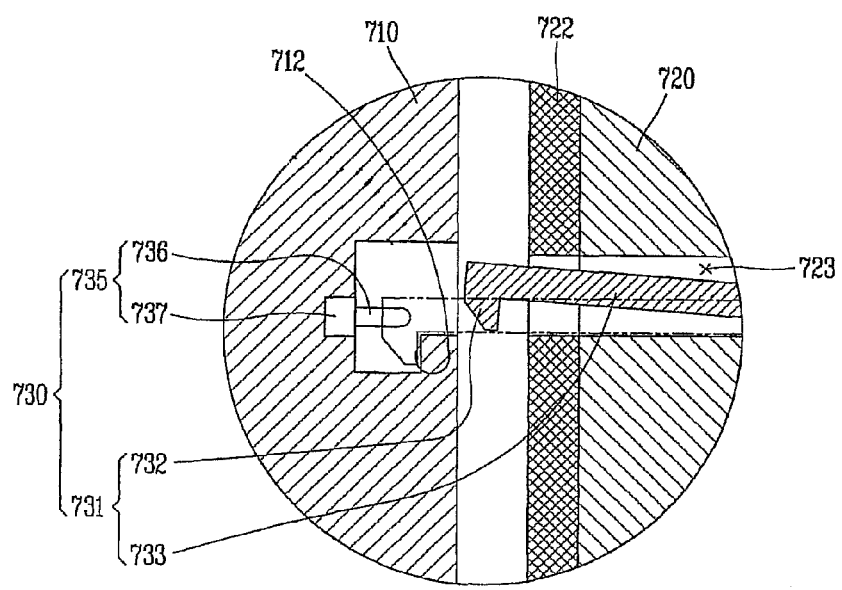
FIG. 21 is a sectional view showing a switch in FIG. 20 released from a pressed state.

FIG. 19 is a perspective view showing a front side of a refrigerator having an ice detecting apparatus of an ice maker according to a seventh embodiment, FIG. 20 is a sectional view showing a switch pressed in the ice detecting apparatus of an ice maker for a refrigerator according to the seventh embodiment, and FIG. 21 is a sectional view showing a switch in FIG. 20 released from a pressed state.

The refrigerator 10 includes the ice maker 100 installed at the freezing chamber door 14, the ice storage container 180, and the dispenser 190. The ice maker 100, the ice storage container 180 and the dispenser 190 are provided at the inner side in the refrigerator 10, and an ice making space forming case 710 and an ice making chamber door 720 are provided to form a space hermetically closed against the exterior in the refrigerator 10.

The ice making space forming case 710 is installed at the freezing chamber door 14 to cover the ice maker 100, the ice storage container 180 and the dispenser 190 installed at the freezing chamber door 14. A portion of the ice making space forming case 710 is open to allow an access from the exterior to the interior. The ice making chamber door 720 opens and closes the opened portion of the ice making space forming case 710.

The ice maker 100 includes the ice detecting sensor 120 to detect whether or not the ice storage container 180 is full of ice, and the sensor heater 128 to apply heat to prevent formation or removal or frost that may form on the ice detecting sensor 120.

A detecting unit or detector 730 detects whether or not the ice making chamber door 720 is open or closed with respect to the ice making space forming case 710. When the ice making chamber door 720 is open, the ice detecting sensor 120 may become frosted by external air of a relatively high temperature, which may lead to erroneous operation of the ice detecting sensor 120.

Thus, in this embodiment, the opening and closing of the ice making chamber door 720 is detected by the detecting unit 730, and a controller may control the operation of the sensor heater 128 according to whether or not the ice making chamber door 720 is open or closed as detected by the detecting unit 730. When the ice making chamber door 720 is open, the controller operates the sensor heater to remove frost formed on the transmitter or receiver module and/or to prevent the formation of frost. When the ice making chamber door 720 is closed or a prescribed time thereafter, the controller stops the operation of the sensor heater.

The operation of the sensor heater described in one or more of the above embodiments is controlled according to whether or not the ice making chamber door 720 is open or closed, whereby the ice detecting sensor 120 can be defrosted and/or the formation of moisture or frost is prevented by the sensor heater. The prevention or defrosting prevents degradation of the detecting performance of the ice detecting sensor 120 and reduce power consumption for performing the frost prevention and/or defrosting operation.

As shown in FIGS. 20 and 21, the detecting unit 730 includes a switch 735 which is turned on or off according to a relative movement of the ice making chamber door 720 and the ice making space forming case 710, and a stopping nook 731 to press the switch 735 to turn on or off the switch 735. In this embodiment, the switch 735 is disposed in a space formed in the ice making space forming case 710, and the stopping hook 731 is disposed at the ice making chamber door 720.

The switch 735 includes a pressed portion 736 that may be moved when pressed by the stopping hook 731, and a switch body 737 including a circuit to be turned on or off according to whether or not the pressed portion 737 is moved. The stopping hook 731 includes a connection portion 733 formed along a hole 723 penetratingly formed in the ice making chamber door 720, and a head portion 732 formed at the end of the connection portion 733. The head portion 732 may be caught at a portion 712 of the ice making space forming case 710 to press the pressed portion 736, to allow the ice making chamber door 720 to be fixed.

The stopping hook 731 and the portion of the ice making space forming case 710 where the stopping hook 731 is caught are engaged with each other to maintain the ice making space forming case 710 in a closed state, which form the stopping units. The switch 735 is disposed at the portion where the stopping units are engaged with each other, and the switch 735 may be turned on or off according to engagement of the stopping units. A hermetically sealed member 722 hermetically seals the ice making space forming case 710 and the ice making chamber door 720.

As shown in FIG. 20, when the stopping hook 731 is caught by the portion 712 of the ice making space forming case 710, the ice making space forming case 710 is closed by the ice making chamber door 720. At this time, the pressed portion 736 of the switch 735 is pressed by the stopping hook 731, and accordingly, the switch 735 is turned off. The controller does not operate the sensor heater 128, or if the sensor heater 128 is being operated, the controller stops the operation of the sensor heater 128 based on operational parameters.

Thereafter, when the ice making chamber door 720 is pulled and/or rotated to open the opened portion of the ice making space forming case 710, the engaged state of the stopping hook 731 and the portion 712 of the ice making space forming case 710 is released. The pressing of the stopping hook 731 to the pressed portion 736 is released, the pressed portion 736 is moved by an operation of a spring or the like installed therein, and accordingly, the switch 735 is turned on. Upon detection of a change in state of the switch 735, the controller operates the sensor heater. Of course, the ON/OFF operation states of the switch 735 may be implemented to be opposite to those in the above description.

The ice making space forming case 710 and the ice making chamber door 720 are disposed in the space formed by the case and the door 13 and 14 of the refrigerator 10, and the detecting unit 720 detects whether or not the ice making space forming case 710 is open or closed by the ice making chamber door 720, but the present disclosure is not limited thereto. As can be appreciated, the detecting unit 730 may be configured to detect whether or not the case of the refrigerator 10 is open or closed by the doors 13 and 14, and accordingly, the operation of the sensor heater may be controlled. In other words, the detecting unit 730 may be configured to detect both whether or not the door of the refrigerator 10 is open or closed by the doors 13 and 14 and/or whether or not the ice making space forming case 710 is open or closed by the ice making chamber door 720 depending upon the structural configuration of the refrigerator. For example, if the ice maker 100 with the ice detecting sensor 120 is provided in the freezing compartment rather than the door, the detecting unit 730 may be provided in the door 14 or the housing of the refrigerator.

Figure 22:
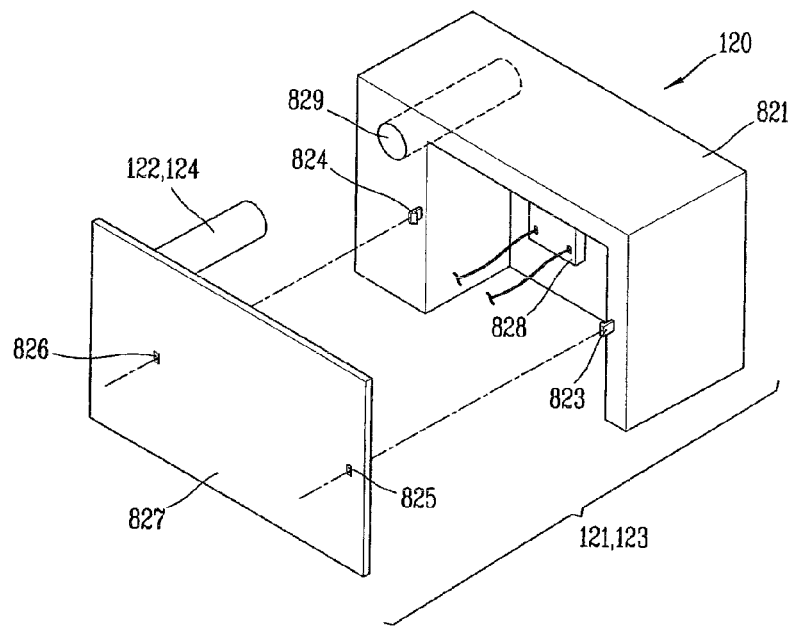
FIG. 22 is a perspective view showing an exploded state of an ice detecting sensor applied to an ice detecting apparatus of an ice maker for a refrigerator according to an eighth embodiment.
Figure 23:
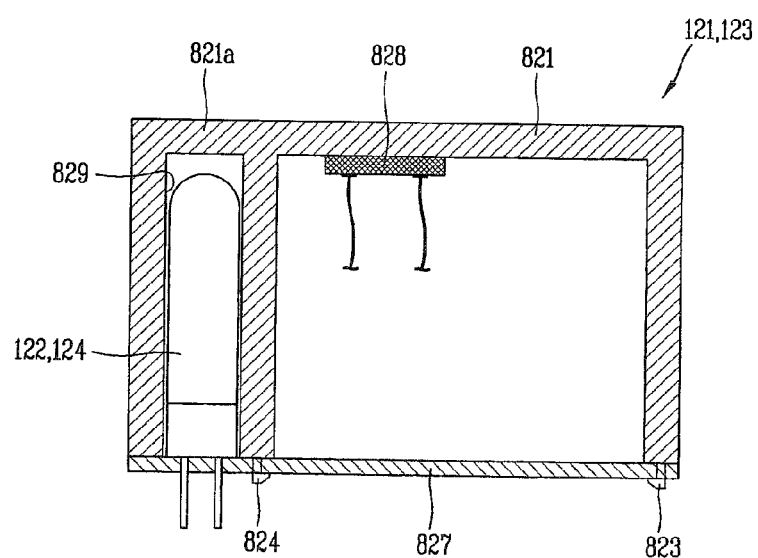
FIG. 23 is a sectional view showing a coupled state of the ice detecting sensor applied to the ice detecting apparatus of the ice maker for the refrigerator according to the eighth embodiment.

FIG. 22 is a perspective view showing an exploded state of an ice detecting sensor applied to an ice detecting apparatus of an ice maker for a refrigerator according to an eighth embodiment, and FIG. 23 is a sectional view showing a coupled state of the ice detecting sensor applied to the ice detecting apparatus of the ice maker for the refrigerator according to the eighth embodiment. An ice detecting sensor 120 includes a transmitting unit or module 121 having a transmitter 122 and a PCB 827. As indicated above for all embodiments, the description for the transmitting unit 121 can be applied in the same or similar manner to a receiving unit or module of the ice detecting sensor 120.

The transmitting unit 121 has a box-like shape housing 821, which has an insertion hole 829 formed at one side thereof. The insertion hole 829 has such a shape that a portion of a rear surface of the housing 821 is recessed in a forward direction. In other words, the insertion hole 829 is not formed to penetrate the transmitting unit 821, with its front side closed off. The transmitter 122 connected to the PCB 827 is inserted into the transmitter insertion hole 829.

The portions of the housing 821, other than the portion where the transmitter insertion hole 829 is formed, may be formed overall in a recessed manner except for the edge (or boundary) portions of the housing 821. The recessed portions, excluding the edge portions of the housing 821, are formed such that they do not penetrate the housing 821 with its front side being blocked or closed off.

A sensor heater 828 is formed at the recessed portion, excluding the edge portions of the housing 821. The sensor heater 828 can remove moisture that may exist on the surface of the housing 821 corresponding to the front portion of the transmitter insertion hole 829 or prevent moisture formation. Thus, signals transmitted by the transmitter 122 can be transmitted without being interfered with by moisture possibly existing on the surface of the housing 821, accurate detection can be possibly performed. On the receiver side, signals from the transmitter can be accurately detected.

In addition, because the sensor heater 828 is installed at the recessed portion, a space for accommodating an electric wire for connecting the sensor heater 828 and a power source can be provided. A molding solution is injected into the recessed portion, excluding the edge portions of the housing 821, namely, into the portion where the sensor heater 828 is installed. The molding solution hardens to hermetically seal the interior of the ice detecting sensor so that external moisture cannot be infiltrated into the PCB 827, the transmitter 122 or the like.

In this embodiment, because the transmitter 122 is inserted and/or aligned in the transmitter insertion hole 829, although the molding solution is injected into the portion where the sensor heater 828 is attached, the molding solution cannot be infiltrated into the transmitter 122. In particular, because the insertion hole 829 is closed, infiltration of the molding solution from the front surface portion of the transmitter 122 can be prevented. Thus, light diffusion at the transmitter 122 can be prevented, and thus, accurate detection can be performed. The housing 821 may be made of substantially transparent material such that light from the transmitter can be transmitted therethrough. Alternatively, the portion 821a of the housing in front of the transmitter 122 may be transparent while the rest of the housing 821 is non-transparent. Alternatively, a hole may be provided at a portion 821a of the housing 821.

In addition, because the transmitter is inserted into the transmitter insertion hole 829, the transmitter 822 is covered, and the transmitter 822 and the housing 821 can be aligned in their position relation without performing any additional process. Therefore, the fabrication of the ice detecting sensor 820 can be facilitated.

A plurality of coupling hooks 823 and 824 are formed on the housing 821, and a plurality of hook coupling holes 825 and 826 are formed on the PCB 827 and aligned with the plurality of coupling hooks 823 and 824. Because the coupling hooks 823 and 824 are aligned with the hook coupling holes 825 and 826, the housing 821 and the PCB 827 can be easily and firmly attached, and the transmitter 822 and the housing 821 can be more easily aligned.

Figure 24:
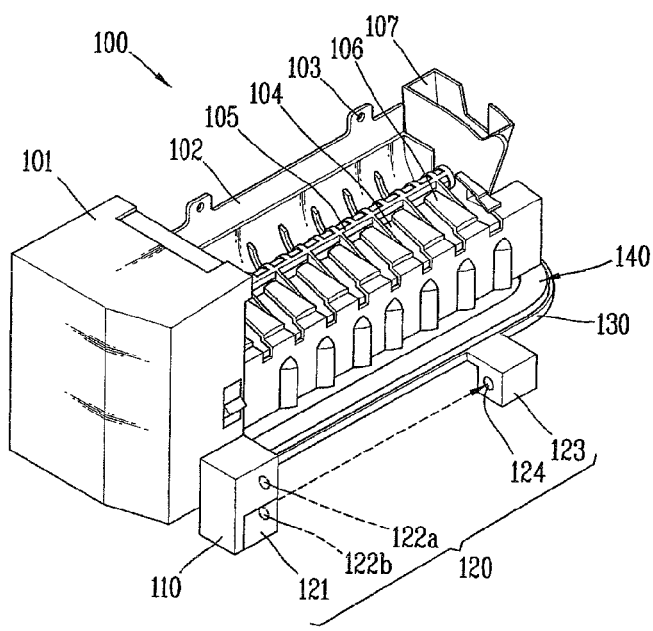
FIG. 24 is a perspective view showing that the ice detecting apparatus of the ice maker for the refrigerator detects a state before full ice according to a ninth embodiment.

FIG. 24 is a perspective view showing that the ice detecting apparatus of the ice maker for the refrigerator detects a state before full ice according to a ninth embodiment of the present invention. A transmitting unit of an ice detecting apparatus includes a plurality of transmitters. Here, it is assumed that the transmitting unit includes two transmitters, for the sake of brevity.

FIG. 24 illustrates two transmitters 122a and 122b disposed in a vertical direction, namely, in the direction of the ice storage container 180 at the ice maker 100. But the two transmitters 122a and 122b may be also disposed in a horizontal direction or a diagonal direction. As can be appreciated, description on other parts in FIG. 24 can be readily understood based on that of the first to eighth embodiment disclosure.

As shown in FIG. 24, when the two transmitters are disposed, because the transmission area is increased, the detection performance of the ice detecting apparatus can be improved. Of course, three or more transmitters may be disposed, and in this case, the transmission are may be further increased.

Figure 25:
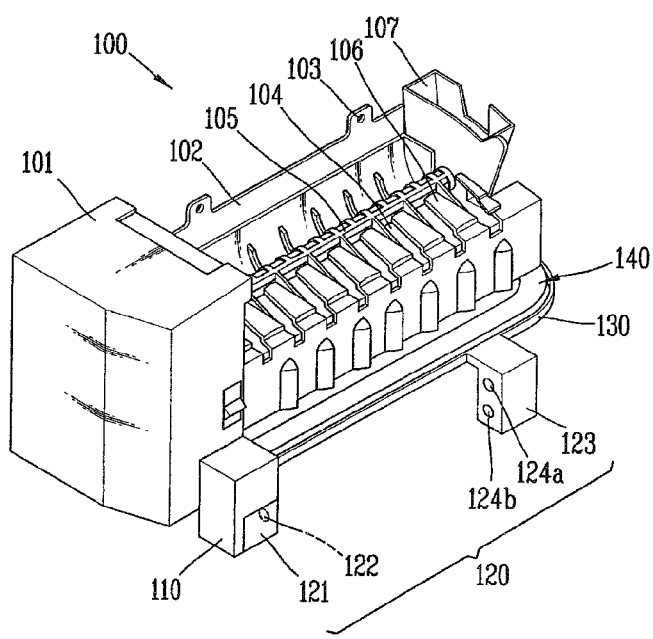
FIG. 25 is a perspective view showing that the ice detecting apparatus of the ice maker for the refrigerator detects a state before full ice according to a tenth embodiment.

FIG. 25 is a perspective view showing that the ice detecting apparatus of the ice maker for the refrigerator detects a state before full ice according to a tenth embodiment. A receiving unit or module of an ice detecting apparatus includes a plurality of receivers. Here, it is assumed that the receiving unit includes two receivers, for the sake of brevity.

FIG. 25 illustrates two receivers 124a and 124b disposed in a vertical direction, namely, in the direction of the ice storage container 180 at the ice maker 100. The two receivers 124a and 124b may be also disposed in a horizontal direction or diagonal direction. Description on other parts in FIG. 25 can be readily understood and appreciated based on that of the first to eighth embodiment disclosure.

When the receivers 124a and 124b are combined in the vertical direction, they can detect to which degree ice is full as well as an ice-full state upon receiving a signal transmitted from the transmitter. For example, if the receiver 124b does not detect a signal while the receiver 124a detects a signal, it can be determined that ice is filled up to the height of the receiver 124b. Meanwhile, when the receivers 124a and 124b are combined in the horizontal direction, they can detect whether there is an error in detecting whether or not ice is completely full as well as an ice-full state upon receiving a signal transmitted from the transmitter. For example, if the receiver 124b has received a signal transmitted from the transmitter while the receiver 124a has not, an error regarding an ice-full state can be detected based on the signal received by the receiver 124b.

As so far described, the ice detecting apparatus of the ice maker for a refrigerator may have one or more of the following advantages. For example, because the sensor heater is disposed near the ice detecting sensor, heat generated from the sensor heater can be transferred to the ice detecting sensor. Frost that may be formed on the ice detecting sensor can be removed, so the ice detecting sensor can accurately and stably detect whether ice-full state of ice transferred from the ice maker. As can be appreciated, the sensor heater may prevent the formation of moisture or frost such that frost formation is not a concern.

Because the extending pipe is formed to surround the receiver and the transmitter of the ice detecting sensor while allowing a detect signal transmitted from the receiver and the transmitter of the ice detecting sensor to pass therethrough and the sensor heater is installed at an outer side of the extending pipe, heat generated from the sensor heater can be effectively transferred to the ice detecting sensor.

Because the sensor heater accommodating body with the sensor heater wound thereon in the form of coil is applied to the ice detecting sensor, heat generated from the sensor heater can be uniformly transferred to the entire surface of the receiver and the transmitter of the ice detecting sensor.

Because the sensor heater is applied to the sensor heater accommodating body such that the sensor heater is wound thereon several times in a coil type, the heating value of the sensor heater can be adjusted according to the number of winding the sensor neater. Thus, the heating value of the sensor heater can be easily adjusted according to an environment where the ice detecting sensor is installed, for example, according to an ambient temperature.

Because the sensor heater is made of an electroconductive heating material that heats by itself, there is no need to additionally form a heater to defrost the receiver and the transmitter of the ice detecting sensor. The configuration of the ice detecting apparatus can be simplified and its fabrication can be facilitated.

Because the sensor heater is made of the electroconductive heating material and it covers the receiver and the transmitter of the ice detecting sensor, heat generated from the sensor heater can be uniformly transferred to the entire surface of the receiver and the transmitter.

Because the sensor heater is made of the electroconductive heating material and it accommodates the receiver and the transmitter of the ice detecting sensor therein, the sensor heater can serve as an extending pipe with respect to the receiver and the transmitter and as a heat supply source for removing frost formed on the receiver and the transmitter. Thus, any additional extending pipe or heater is not required to defrost the receiver and the transmitter, resulting in the simplification of the configuration of the ice detecting apparatus and facilitation of the fabrication.

The receiver and transmitter of the ice detecting sensor and the sensor heater are disposed in a hermetically closed space by the hermetically closed case, and a front side of the receiver and the transmitter can be inserted into the extending pipe while the body can be exposed to the hermetically closed space. Thus, heat generated by the sensor heater can heat air within the hermetically closed space, and heat can be transmitted to the receiver and the transmitter through the heated air, increasing the efficiency of heat transmission from the sensor heater to the receiver and the transmitter.

Because whether or not the door is open or closed with respect to the external case can be detected by the detecting unit, the controller can control the operation of the sensor heater according to the open and closed state of the door. By removing frost formed on the ice detecting sensor or by preventing frost formation, power consumption for performing a defrosting and/or frost prevention operation can be reduced while preventing degradation of detection performance of the ice detecting sensor.

The ice detecting sensor disposed at the ice maker body detects an ice-full state of ice collected within the ice storage container after being discharged from the ice maker, a phenomenon that a mechanical ice detecting lever or the like for detecting ice-full state is frozen so that it cannot properly detect an ice-full state can be prevented, and whether or not the ice accommodating container is full of ice can be accurately and stably detected.

The detection height of the ice-full state detecting sensor corresponds to the height of ice-full state in the ice storage container which has a certain height difference from an upper end of the ice accommodating container. Thus, whether or not the ice storage container is full of ice can be accurately detected by the ice-full state detecting sensor.

U.S. application Ser. No. 12/423,118 filed on Apr. 14, 2009 discloses similar subject matter and the entire disclosure therein is incorporated herein by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ice detecting apparatus for an ice maker provided in a refrigerator, the apparatus comprising:
   an ice maker body;
   a supporting member connected at a lower portion of the ice maker body and having an extending portion at a side of the supporting member extending in a downward direction; and
   an ice detecting sensor attached to the ice maker body and detecting an amount of ice collected in an ice container, wherein the ice detecting sensor includes:
   a sensor housing installed at a side of the ice maker body and extending in a downward direction from the ice maker body to a position corresponding to the extending portion;
   at least one optical transmitter provided on one side of the ice maker installed at the sensor housing;
   at least one optical receiver installed at the extending portion of the supporting member to face the optical transmitter, the optical transmitter and the optical receiver being separated by a prescribed distance;
   at least one mounting recess that extends along one side of at least one of the optical transmitter or the optical receiver, the at least one mounting recess having a vertically oriented rectangular shape;
   at least one heater mounted in the at least one mounting recess, wherein the at least one heater generates and transfers heat to the at least one of the optical transmitter or the optical receiver;
   a sensor cover housing at least one of the optical transmitter or the optical receiver and the heater; and
   a printed circuit board in contact with the at least one heater and the at least one of the optical transmitter or the optical receiver,
   wherein the at least one mounting recess is formed on a rear surface of the sensor cover, and an insertion hole is formed in the cover to receive the at least one of the optical transmitter or the optical receiver therein, wherein the printed circuit board is provided at a rear surface of the sensor cover such that at least some portion of the at least one mounting recess and one end of the insertion hole are covered by the printed circuit board such that heat generated by the heater is transmitted to the at least one of the optical transmitter or the optical receiver via the sensor cover and the printed circuit board, wherein the one end of the insertion hole formed in the sensor cover is located at position corresponding to a transmitting portion of the optical transmitter or at a receiving portion of the optical receiver.

2. The apparatus of claim 1, wherein the heater is electrically connected with a controller provided at the ice maker.

3. The apparatus of claim 1, wherein the sensor cover allows the signal of the optical transmitter to be sent or the optical signal to be detected by the optical receiver.

4. The apparatus of claim 3, wherein the heater is disposed at an inner side of the sensor cover to heat the sensor cover.

5. The apparatus of claim 1, wherein the heater is made of an electroconductive heating material.

6. The apparatus of claim 1, wherein the ice detecting sensor further comprises the printed circuit board and the sensor cover, the optical receiver or the optical transmitter being inserted into the sensor cover through an opening on one side of the sensor cover and another side of the sensor cover is closed.

7. The apparatus of claim 1, wherein the optical transmitter is a light emitting diode and the optical receiver is a photo diode.

8. The apparatus of claim 1, wherein the optical transmitter and optical receiver are infrared sensors disposed at both sides of an ice discharge outlet of the ice maker to transmit and receive infrared rays traversing the ice discharge outlet.

9. The apparatus of claim 1, wherein the heater generates heat when a controller detects opening or closing a door of the refrigerator.

10. The apparatus of claim 9, wherein the ice maker is provided within a compartment of the door, the compartment having an access door.

11. The apparatus of claim 10, wherein the heater generates heat when the access door is opened.

12. The apparatus of claim 1, wherein the heater generates heat when a controller detects opening or closing a door of the refrigerator.

13. The apparatus of claim 1, wherein the sensor housing extends in a downward direction by a prescribed distance such that the at least one optical transmitter and the at least one optical receiver are provided below an upper ridgeline of the ice container.

14. An ice detecting apparatus for an ice maker provided in a refrigerator, the apparatus comprising:
   an ice maker having an ice maker body, an ice making chamber, a heater installed at a lower portion of the ice making chamber, and a heater support formed at a lower portion of the heater, wherein the heater support comprises a portion at a side of the heater support extending in a downward direction; and
   an ice detecting sensor attached to the ice maker and detecting an amount of ice collected in an ice container, wherein the ice detecting sensor includes:
   a sensor housing installed at a side of the ice maker body and extending in a downward direction from the ice maker body to a position corresponding to the portion of the heater support;
   an optical transmitter installed at the sensor housing;
   an optical receiver installed at the portion of the heater support to face the optical transmitter, the optical transmitter and the optical receiver being separated by a prescribed distance;
   a mounting recess that extends along one side of the optical transmitter;
   a sensor heater mounted in the mounting recess, wherein the sensor heater generates and transfers heat to the optical transmitter;
   a printed circuit board in contact with the sensor heater and the optical transmitter,
   wherein the mounting recess is formed on a rear surface of a sensor cover, and an insertion hole is formed in the sensor cover to receive the optical transmitter therein, wherein the printed circuit board is provided at a rear surface of the sensor cover such that at least some portion of the mounting recess and one end of the insertion hole are covered by the printed circuit board such that heat generated by the sensor heater is transmitted to the optical transmitter via the sensor cover and the printed circuit board, wherein the one end of the insertion hole formed in the sensor cover is located at position corresponding to a receiving portion of the optical receiver.

15. The apparatus of claim 14, wherein the sensor heater is electrically connected with a controller provided at the ice maker.

16. The apparatus of claim 14, wherein the optical transmitter and optical receiver are infrared sensors disposed at both sides of an ice discharge outlet of the ice maker to transmit and receive infrared rays traversing the ice discharge outlet.

17. The apparatus of claim 14, wherein the sensor heater generates heat when a controller detects opening or closing a door of the refrigerator.

18. The apparatus of claim 17, wherein the ice maker is provided within a compartment of the door, the compartment having an access door.

19. The apparatus of claim 18, wherein the sensor heater generates heat when the access door is opened.

20. The apparatus of claim 14, wherein the sensor heater generates heat when a controller detects opening or closing a door of the refrigerator.

* * * * *